3,051,573
Patented Aug. 28, 1962

3,051,573
FEED CONTAINING CARBOXYMETHOXYLAMINE
Jonas Kamlet, New York, N.Y., assignor to E. I. du Pont de Nemours and Company, Wilmington, Del., a corporation of Delaware
No Drawing. Filed Nov. 27, 1959, Ser. No. 855,532
4 Claims. (Cl. 99—4)

This invention relates to feed supplements for animals and more particularly to novel feed compositions which are fortified with a small amount of carboxymethoxylamine.

According to the present invention, it has been found that the addition of a small amount of carboxymethoxylamine to livestock and poultry rations results in improved animal growth and better feed efficiency. The inclusion of this compound in conventional poultry feeds and diets has a particularly stimulating effect on chick growth.

As used herein, carboxymethoxylamine is intended to include closely related derivative compounds thereof, including, for example, salts such as the hydrochloride, sulfate, ammonium, and alkali metal salts including especially the sodium and potassium salts. A particularly preferred compound is carboxymethoxylamine hemi-hydrochloride.

The compound within the scope of this invention is mixed with the feed by any conventional means. This can be done advantageously by grinding such compound with some of the grain, such as for instance corn, or with other components of conventional animal feed such as vitamins, soy bean meal, choline chloride, limestone, granite, grit, oyster shells, or the like, to provide a concentrate composition containing the carboxymethoxylamine in an amount of about 5 to 50% by weight. The ground mixture can then be further mixed in a proper proportion with the feed.

It will be understood that the feed supplement in the nature of a concentrate consisting of a compound within the scope of this invention and a solid carrier can be sold to the trade for incorporation in feeds. The carboxymethoxylamine will preferably be present in such supplement in the ratio in which it is desired in the final feed. The solid carrier present in the feed supplements of this invention may or may not have nutritional value. Illustrative of the solid carriers which can be employed in the novel feed supplements, there can be named soy bean meal, choline chloride, vitamins, such as for instance, riboflavin, niacin, vitamin $B_{12}$, vitamin D; cottonseed meal, corn, mineral mixtures, walnut shells, diatomaceous earth, and the like. These named solid carriers along with any others known in the feed industry to be employed in feed supplements can be used in the compositions of this invention.

If desired, the carboxymethoxylamine can be supplied to the user in the form of a highly concentrated mixture with a solid carrier or feed supplement, as described above, and the user can then simply add the required amount of this mixture to a larger quantity of standard feed.

The amount of carboxymethoxylamine added to the animal diet will depend upon the attendant circumstances and the nature of the effect desired. The level of the compound in the feed should not be less than 0.001% nor greater than about 0.1%, based on the total weight of the animal's feed. Expressed in another way, the amount of carboxymethoxylamine in the animal's feed will ordinarily be within the range from about 10 to 1,000 grams of carboxymethoxylamine per ton of animal feed.

Using the hemi-hydrochloride compound, for example, a preferred amount of from about 20 to 200 grams of this compound per ton of feed exerts a growth improvement in feeding chicks approximately equal to that realized by feeding chicks procaine penicillin at the level which is commercially practiced.

In order that the invention can be better understood, the following illustrative examples are given: Those skilled in the art will appreciate that other compositions according to this invention can be prepared and applied in accordance with the examples.

*Example 1*

A chick diet is compounded from the ingredients and in the amounts as follows:

| | Parts by weight |
|---|---|
| Yellow corn | 49.0 |
| Corn gluten meal | 5.0 |
| Distillers solubles | 4.0 |
| Alfalfa meal | 2.0 |
| Soy bean meal | 28.0 |
| Precipitated chalk | 1.5 |
| Bone meal | 2.5 |
| Iodized salt | 0.25 |
| Manganese sulfate | 0.025 |
| Vitamins A and D oil | 1.0 |
| Choline chloride | 0.05 |
| Mixed vitamins | 0.10 |

Two groups of day-old New Hampshire chicks are placed in separate pens and fed under controlled diet conditions for a period of twenty-eight days. One group is provided with the above basal chick diet while the second group is fed the same diet to each ton of which is added 75 grams of carboxymethoxylamine hemi-hydrochloride.

The group receiving the carboxymethoxylamine supplement shows an average improvement of 24.5% in weight increase compared with the control group. Also, the group receiving the feed supplement according to this invention exhibits a significant improvement in feed conversion of approximately 10.0% when compared with the control group.

*Example 2*

Two groups of turkey poults are placed in separate pens and fed the identical commercial feed of the following composition, wherein the indicated amounts are percent by weight:

| | Percent |
|---|---|
| Corn meal, yellow | 43.95 |
| Soy bean oil meal dehulled | 27.00 |
| Alfalfa meal, dehydrated | 2.00 |
| Fish meal | 5.00 |
| Whey (dried) | 2.00 |
| Brewer's yeast | 3.00 |
| Liver meal | 2.00 |
| Meat and bone meal | 4.00 |
| Prime beef tallow | 5.00 |
| Calcite | 2.00 |
| Dicalcium phosphate | 2.00 |
| Choline chloride | 0.02 |
| Vitamin $D_3$ supplement (3000 ICU/gram) | 0.08 |
| Vitamin A supplement (5000 USF units/gram) | 0.40 |
| Iodized salt | 0.45 |
| Manganese sulfate | 0.05 |
| Ca-methionine hydroxy analog | 0.05 |
| Vitamin premix | 1.00 |
| | 100.00 |

One part of the vitamin premix contains the following ingredients at the indicated concentrations:

| | Percent |
|---|---|
| Niacin | 0.004 |
| Calcium pantothenate | 0.002 |
| Riboflavin | 0.0005 |
| Folic acid | 0.0001 |
| Vitamin $B_{12}$ | 0.000002 |

Each group of these turkeys is maintained on this identical basal diet until of commercial sale weight, with the exception that one of the groups has incorporated with its feed carboxymethoxylamine in an amount of 0.02% based on the total weight of the feed. The group receiving this compound as a supplement shows a significant improvement in performance over the first group.

*Example 3*

This example demonstrates the practice of the invention by the incorporation in a commercial swine animal diet (20% protein sow and pig feed) of various amounts of carboxymethoxylamine within the ranges described above for this invention. A basal swine feed diet is utilized containing wheat flour middlings, corn meal, oats, alfalfa meal, soy bean meal, meat scraps, and supplement of vitamins, minerals and antibiotics. The animal fat is preserved with anti-oxidants. In addition to a control group, additional separate groups of swine are fed, besides the basal diet, carboxymethoxylamine hemi-hydrochloride salt in an amount of, respectively 10 grams, 25 grams, 50 grams, 75 grams, 100 grams and 200 grams per ton of feed, with resulting significant improvement in weight increase and feed conversion evidenced in those groups receiving the carboxymethoxylamine feed supplement.

*Example 4*

Three concentrate compositions are made by admixing respectively (1) 0.5, (2) 2.5 and (3) 5.0 grams of carboxymethoxylamine hemi-hydrochloride with ground corn to make in each case a total mix of 250 grams.

A basal diet is prepared of the following ingredients, wherein the figures given are percent by weight:

| | |
|---|---:|
| Yellow corn | 47.52 |
| Soybean meal (dehulled, 50%) | 28.80 |
| Fat | 10.05 |
| Alfalfa meal | 2.00 |
| Fish meal | 4.00 |
| Dried whey | 2.00 |
| Corn distiller solubles | 2.00 |
| Calcite flour | 1.00 |
| Dicalcium phosphate | 1.25 |
| Iodized salt | 0.25 |
| Manganese sulfate | 0.03 |
| Vitamin supplement | 1.00 |
| Na-methionine hydroxy analog | 0.10 |
| | 100.00 |

The vitamin supplement provides the following in milligrams per one hundred grams:

| | |
|---|---:|
| Alpha-tocopherol | 0.25 |
| Niacin | 2.00 |
| D-calcium pantothenate | 1.00 |
| Riboflavin | 0.25 |
| Folic acid | 0.05 |
| Menadione | 0.05 |
| Vitamin $B_{12}$ | 0.0011 |
| Choline Cl | 50.00 |
| $D_3$ (3000) | 50.00 |
| A (5000) | 100.00 |

Concentrate (3) is admixed in suitable amounts with three separate portions of the basal diet to provide feeds containing respectively 0.002%, 0.01% and 0.02% by weight of the carboxymethoxylamine compound.

Eight groups each containing 48 male cross-breed chicks are used in this test. Two groups are given the feed containing 0.002%, two other groups that contain 0.01% and two other groups that contain 0.02% of the carboxymethoxylamine compound. Two other groups are given the basal diet only as control groups.

Test results after a period of only two weeks are as follows:

| Group | Diet | Weight Gain, Average | Feed/Gain, Average |
|---|---|---|---|
| A | Basal only | 152 | 1.60 |
| B | Basal only | | |
| C | Basal plus 0.002% CMA | 166 | 1.47 |
| D | Basal plus 0.002% CMA | | |
| E | Basal plus 0.01% CMA | 185 | 1.45 |
| F | Basal plus 0.01% CMA | | |
| G | Basal plus 0.02% CMA | 185 | 1.44 |
| H | Basal plus 0.02% CMA | | |

In addition to the basal feeds described above as illustrative of feeds which can be improved by the novel supplements of this invention, it will be understood that any of the basic animal feeds known in the art can be advantageously supplemented by a carboxymethoxylamine according to this invention. These basic feeds, which contain carbohydrate, protein, fat, vitamins and mineral sources, are usually rather complex mixtures containing such nutrient elements as ground wheat, corn, oat, groats, fish meal, meat meal, dried milk, soy bean oil meal and alfalfa meal. To these nutrients there is added bone meal, limestone, salt, choline chloride and vitamins.

The above and similar examples can be carried out in accordance with the teachings of this invention by substituting one or more of the other compositions within the scope of the invention for those illustrated in the examples, and substituting other diets for the exemplary diets recited above.

For convenience, the invention has been described primarily from the standpoint of a supplemented poultry or swine feed. It will be understood that in speaking of poultry feed herein is intended to include broadly chick feeds, broiler rations, and in general all feeds of chickens, turkeys, ducks, geese, and other poultry. It will be further understood that dairy feed and feeds for such animals as sheep, goats, horses, steers, and the like can likewise be improved by including therein a carboxymethoxylamine according to this invention.

Thus, the foregoing detailed description has been given for clearness of understanding only and no unnecessary limitations are to be understood therefrom.

The invention claimed is:

1. A solid feed concentrate comprising carboxymethoxylamine in an amount of from about 5 to 50% by weight of carboxymethoxylamine and a solid carrier.

2. A solid feed composition comprising solid animal feed and, in an amount sufficient to provide weight increase and feed conversion improvement in an animal, carboxymethoxylamine in an amount from 0.001% to about 0.1% based on the total weight of the animal's feed.

3. A poultry feed containing carbohydrate, protein, fat, mineral and vitamin, and from about 10 to 1000 grams per ton of feed of carboxymethoxylamine.

4. A process comprising incorporating in a diet of an animal from about 0.001% to about 0.1% of carboxymethoxylamine, based on the total weight of the animal's feed.

References Cited in the file of this patent

UNITED STATES PATENTS 2,464,197    Clarke _____ Mar. 15, 1949